US007257071B2

(12) United States Patent
Kim et al.

(10) Patent No.: US 7,257,071 B2
(45) Date of Patent: Aug. 14, 2007

(54) APPARATUS AND METHOD FOR DETECTING FRAME SYNCHRONIZATION SIGNAL FOR REDUCING ERRORS IN DATA DEMODULATION IN OPTICAL DISC SYSTEM

(75) Inventors: Dae-woong Kim, Seoul (KR); Soo-woong Lee, Seongnam (KR)

(73) Assignee: Samsung Electronics Co., Ltd. (KR)

( * ) Notice: Subject to any disclaimer, the term of this patent is extended or adjusted under 35 U.S.C. 154(b) by 617 days.

(21) Appl. No.: 10/799,323

(22) Filed: Mar. 12, 2004

(65) Prior Publication Data

US 2004/0184379 A1 Sep. 23, 2004

(30) Foreign Application Priority Data

Mar. 17, 2003 (KR) ........................ 10-2003-0016491

(51) Int. Cl.
*G11B 7/00* (2006.01)
(52) U.S. Cl. .............................. 369/53.34; 369/47.28; 369/47.18
(58) Field of Classification Search ............. 369/53.34, 369/47.28, 59.26, 47.18; 375/354
See application file for complete search history.

(56) References Cited

U.S. PATENT DOCUMENTS 4,979,192 A * 12/1990 Shimizume et al. ........ 375/362

6,577,569 B1 * 6/2003 Yamamoto et al. ...... 369/47.18

FOREIGN PATENT DOCUMENTS

| JP | 9-320177 | 12/1997 |
|---|---|---|
| KR | 1998-042667 | 8/1998 |

* cited by examiner

*Primary Examiner*—Wayne Young
*Assistant Examiner*—LaTanya Bibbins
(74) *Attorney, Agent, or Firm*—Mills & Onello LLP

(57) ABSTRACT

A frame synchronization signal detection apparatus includes a synchronization signal detector, a main frame synchronization signal generator, a sub frame synchronization signal generator, and an output unit. The synchronization signal detector detects and outputs a synchronization signal from a digital data signal. The main frame synchronization signal generator detects and outputs a first valid synchronization signal from the synchronization signal, as an internal frame synchronization signal, and generates and outputs a first insertion synchronization signal, as the internal frame synchronization signal, if the first valid synchronization signal is not detected in a predetermined first time period. The sub frame synchronization signal generator detects and outputs a second valid synchronization signal from a synchronization signal. The output unit outputs a frame synchronization signal. The main frame synchronization signal generator stops generating the first insertion synchronization signal, and detects and outputs a first valid synchronization signal as an internal frame synchronization signal.

6 Claims, 9 Drawing Sheets

APPARATUS AND METHOD FOR DETECTING FRAME SYNCHRONIZATION SIGNAL FOR REDUCING ERRORS IN DATA DEMODULATION IN OPTICAL DISC SYSTEM

BACKGROUND OF THE INVENTION

This application claims the priority of Korean Patent Application No. 2003-16491, filed on Mar. 17, 2003, in the Korean Intellectual Property Office, the contents of which are incorporated herein in their entirety by reference.

1. Field of the Invention

The present invention relates to an apparatus which detects a frame synchronization signal in an optical disc system and a method of detecting the frame synchronization signal, and more particularly, to an apparatus and method for detecting a frame synchronization signal, capable of reducing errors in data demodulation in an optical disc system.

2. Description of the Related Art

Generally, a digital data signal reproduced from an optical disc has a frame structure divided by a frame synchronization signal and is subjected to EFM (Eight-to-Fourteen Modulation).

The EFM modulated digital data signal is input to the Digital Signal Processor (DSP) shown in FIG. 1 and is subjected to EFM modulation, error correction, error detection, descrambling, etc., by the DSP.

FIG. 1 is a block diagram of a general DSP. As shown in FIG. 1, the DSP 10 comprises an EFM demodulator 11, a Constant Linear Velocity (CLV) controller 14, an ECC unit 15, an interface 17, a descrambler 18, an EDC unit 19, and a transmitter 20.

The EFM demodulator 11 includes a frame synchronization signal detector 12 and a demodulator 13. The frame synchronization signal detector 12 detects a frame synchronization signal FRA_SYN from a digital data signal EFM input from an external source, and outputs the detected signal FRA_SYN to both the CLV controller 14 and the demodulator 13. The demodulator 13 aligns data in the frame of a received signal on the basis of the frame synchronization signal FRA_SYN.

The CLV controller 14 outputs a predetermined control signal CTL to a spindle motor driver (not shown) in response to the frame synchronization signal FRA_SYN. The spindle motor driver controls the rotation speed of a disc according to the control signal CTL.

Meanwhile, due to damage on the disk surface including scratches, finger-prints, black-dots, etc., a time interval can exist during which the frame synchronization signal FRA_SYN is not detected (that is, the frame synchronization signal FRA_SYN is deactivated at a logic 0). In the time interval during which the frame synchronization signal FRA_SYN is not detected, the CLV controller 14 determines that the rotational speed of the disc is slow, and outputs a predetermined control signal CTL for acceleration to the spindle motor driver. This can result in excessive increase of the rotational speed of the disc.

To solve this problem, a conventional method prevents the CLV controller 14 from being operated in error by inserting a predetermined frame synchronization signal during a predetermined time period in the time interval that the frame synchronization signal is not detected.

Referring to FIGS. 2 and 3, the configuration and operation of a frame synchronization signal detector according to a conventional technique will be described below.

FIG. 2 is a block diagram of a frame synchronization signal detector according to a conventional technique.

As shown in FIG. 2, the frame synchronization signal detector 30 comprises a synchronization signal detector 31, a window signal generator 32, a valid synchronization signal detector 33, an insertion synchronization signal generator 34, a frame synchronization signal output unit 35, and a counter 36.

The synchronization signal detector 31 detects and outputs a synchronization signal DET_SYN from a digital data signal EFM output from an RF amplifier (not shown). The window signal generator 32 enables a window signal WIND during a predetermined time period in response to a predetermined counting signal CNT. If the synchronization signal detector 31 outputs a synchronization signal DET_SYN in the time interval during which the window signal WIND is enabled, the valid synchronization signal detector 33 outputs the synchronization signal DET_SYN as a valid synchronization signal VAL_SYN, as shown in FIG. 3.

When the frame synchronization signal output unit 35 receives the valid synchronization signal VAL_SYN or an insertion synchronization signal INS_SYN, the frame synchronization signal output unit 35 outputs the received signal as a frame synchronization signal FRA_SYN.

The counter 36 is reset in response to the frame synchronization signal FRA_SYN, counts the rising edges or falling edges of a channel clock signal CH_CLK, and increases a count value. The counter 36 outputs the counting signal CNT when the count value reaches a predetermined value. Whenever the frame synchronization signal FRA_SYN is detected (that is, the frame synchronization signal FRA_SYN is activated at a logic 1), the counter 36 is reset to have a count value of "zero" and restarts counting the rising edges or falling edges of the channel clock signal CH_CLK.

If the valid synchronization signal VAL_SYN is not detected during a predetermined time period, the insertion synchronization signal generator 34 generates a predetermined number of cycles of an insertion synchronization signal INS_SYN.

If the counting signal CNT is not received, the insertion synchronization signal generator 34 determines that the valid synchronization signal VAL_SYN is not detected. At this time, the counter 36 is not reset and continuously counts the rising edges or falling edges of the channel clock signal CH_CLK. As a result, the count value reaches the predetermined value.

When the count value reaches the predetermined value, the insertion synchronization signal generator 34 generates the insertion synchronization signal INS_SYN and resets the counter 36. The insertion synchronization signal generator 34 generates the insertion synchronization signal INS_SYN per a predetermined time interval.

If the insertion synchronization signal generator 34 outputs all the cycles of the insertion synchronization signal INS_SYN generated because the valid synchronization signal VAL_SYN was at a logic low, the window signal generator 32 enables the window signal WIND until a synchronization signal DET_SYN is detected. That is, the window signal generator 32 opens a window.

The operation of the conventional frame synchronization signal detector constructed above will be described with reference to FIG. 3. FIG. 3 is a timing diagram of main signals of the frame synchronization signal detector of FIG. 2.

In FIG. 3, "A" represents a waveform of the digital data signal EFM in a case where the disc surface is damaged, and "B" represents an excited interval.

As shown in FIG. 3, the synchronization signal DET_SYN is not detected during the "A" interval of the digital data signal EFM. The insertion synchronization signal generator 34 generates the predetermined number of cycles of the insertion synchronization signal INS_SYN during a predetermined time period, for example, in the interval denoted by "C" in FIG. 3. That is, instead of an actually detected synchronization signal DET_SYN, the frame synchronization signal detector 30 outputs the insertion synchronization signal INS_SYN as a frame synchronization signal. FRA_SYN during the "C" interval.

However, the frame synchronization signal detector 30 continuously outputs the insertion synchronization signal INS_SYN as the frame synchronization signal FRA_SYN until the window is open, although an actual valid synchronization signal DET_SYN is detected during in the "D" interval of FIG. 3. Also, the frame synchronization signal detector 30 does not output the actually detected valid synchronization signal DET_SYN as the frame synchronization signal FRA_SYN until the predetermined number of the cycles of the insertion synchronization signal INS_SYN is output during the "C" interval.

As a result, the demodulator 13 of FIG. 1 demodulates data based on the insertion synchronization signal INS_SYN, during the "D" interval. In this case, because the insertion synchronization signal. INS_SYN is not an actually detected value, the demodulator 13 cannot correctly demodulate data, which results in the generation of errors in data demodulation.

SUMMARY OF THE INVENTION

The present invention provides an apparatus for detecting a frame synchronization signal in an optical disc system and a method of detecting the frame synchronization signal, capable of reducing errors in data demodulation, by outputting a valid synchronization signal detected in an insertion synchronization signal generation interval as the frame synchronization signal.

According to an aspect of the present invention, there is provided an apparatus for detecting a frame synchronization signal in an optical disc system, the apparatus detecting the frame synchronization signal from a digital data signal reproduced from the optical disc, the apparatus comprising a synchronization signal detector, a main frame synchronization signal generator, a sub frame synchronization signal generator, and an output unit. The synchronization signal detector detects and outputs a synchronization signal from the digital data signal. The main frame synchronization signal generator detects and outputs a first valid synchronization signal from the synchronization signal, as an internal frame synchronization signal. The main frame synchronization signal generator generates and outputs a first insertion synchronization signal as an internal frame synchronization signal, if the first valid synchronization signal is not detected in a predetermined first time period. The sub frame synchronization signal generator detects and outputs a second valid synchronization signal from a synchronization signal, while the main frame synchronization signal generator generates the first insertion synchronization signal. The output unit outputs a frame synchronization signal, in response to the interval frame synchronization signal and the second valid synchronization signal. The main frame synchronization signal generator stops generating the first insertion synchronization signal, in response to the second valid synchronization signal, and detects and outputs the first valid synchronization signal as an internal frame synchronization signal.

In one embodiment, the main frame synchronization signal generator comprises: a first valid synchronization signal detector, which detects and outputs the first valid synchronization signal from the synchronization signal in response to a predetermined first window signal; an interval frame synchronization signal output unit, which outputs the internal frame synchronization signal in response to the first valid synchronization signal, the second valid synchronization signal, and the first insertion synchronization signal; a first counter, which is reset in response to the internal frame synchronization signal, counts a predetermined channel clock signal, increases a count value, and outputs a first counting signal when the count value reaches a predetermined value; a first window signal generator, which enables the first window signal during a predetermined second time period in response to the first counting signal; and a first insertion synchronization signal generator, which generates the first insertion synchronization signal, if the first valid synchronization signal received from the first valid synchronization signal detector is not activated during the predetermined first time period.

In one embodiment, the sub frame synchronization signal generator comprises: a second valid synchronization signal detector, which detects and outputs the second valid synchronization signal from the synchronization signal in response to a predetermined second window signal; a reset signal output unit, which outputs a reset signal in response to the synchronization signal and a second insertion synchronization signal; a second counter, which is reset in response to the reset signal, counts a predetermined channel clock signal, increases a count value, and outputs a second counting signal when the count value reaches the predetermined value; a second window signal generator, which enables the second window signal during the predetermined second time period in response to the second counting signal; and a second insertion synchronization signal generator, which generates the second insertion synchronization signal if the synchronization signal received from the synchronization signal detector is not activated during the predetermined first time period after the second counter is reset.

The predetermined first time period can be a time taken until the accumulated counting value reaches the predetermined value, after the first and the second counters are reset.

According to another aspect of the present invention, there is provided a method of detecting a frame synchronization signal in a frame synchronization signal detection apparatus of an optical disc system, the frame synchronization signal detection apparatus comprising: a synchronization signal detector which detects a synchronization signal from a digital data signal; a main frame synchronization signal generator, which outputs, as an internal frame synchronization signal, one of a first valid synchronization signal detected from the synchronization signal and an insertion synchronization signal internally generated; a sub frame synchronization signal generator, which detects a second valid synchronization signal, while the main frame synchronization signal generator generates the insertion synchronization signal; and an output unit, which outputs a frame synchronization signal, in response to the internal frame synchronization signal and the second valid synchronization signal, the method comprising: (a) detecting the first valid synchronization signal from the digital data signal; (b) outputting the first valid synchronization signal as the frame synchronization signal, when the first valid synchronization signal is detected within a predetermined time interval; (c) generating and outputting the insertion synchronization signal as the frame synchronization signal, if the first valid synchronization signal is not detected during the predetermined time interval; and (d) returning to step (a), if the second valid synchronization signal is activated while the insertion synchronization signal is generated.

In one embodiment, step (d) listed above includes: (e) resetting a counter of the sub frame synchronization signal generator, when the synchronization signal is detected; (f) the counter counting the channel clock signal; (g) outputting the second valid synchronization signal as the frame synchronization signal if the second valid synchronization signal is detected when the count value of the counter reaches a predetermined value; and (h) resetting the counter and returning to step (f), if the second valid synchronization signal is not detected when the count value of the counter reaches the predetermined value.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
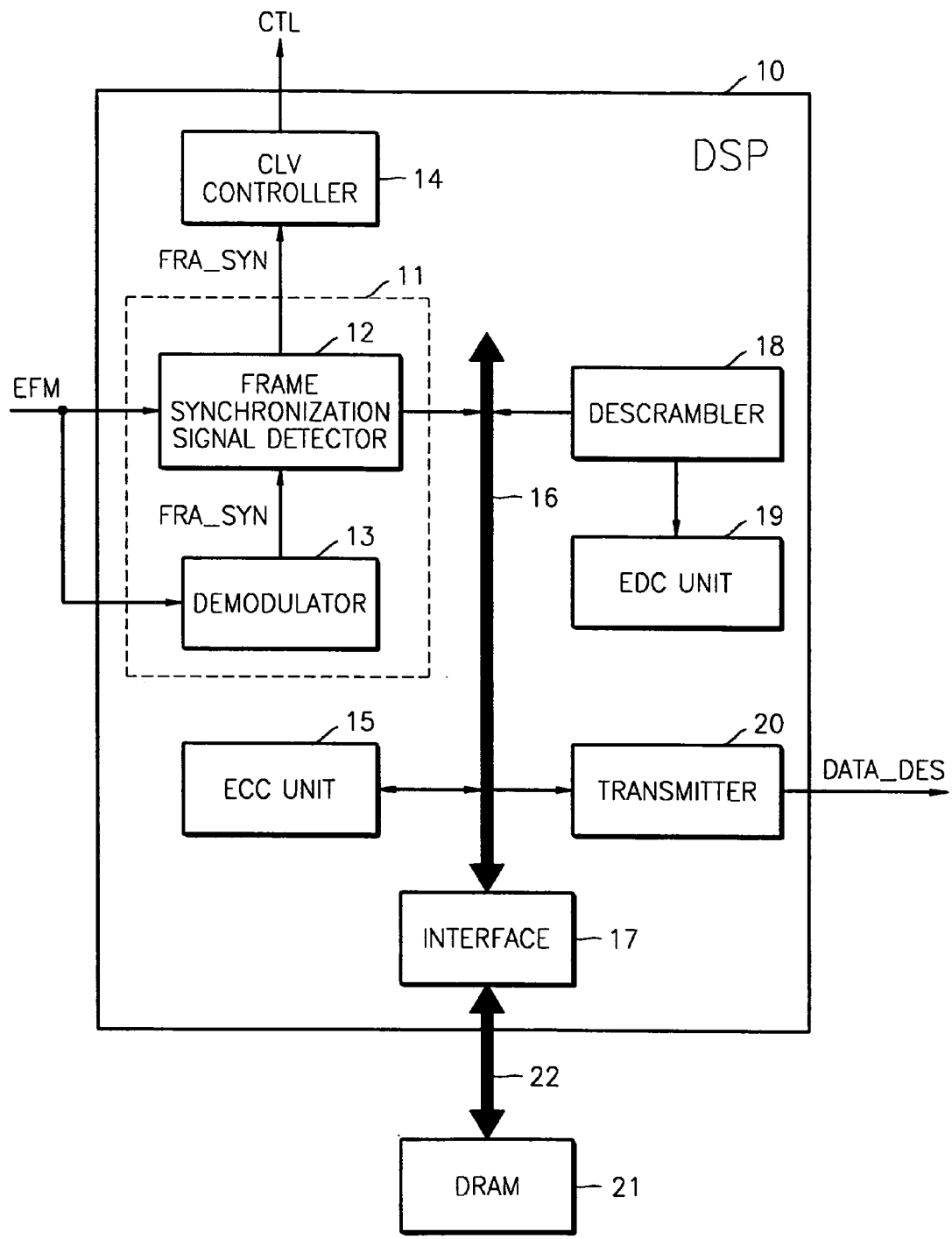
FIG. 1 is a block diagram of a general digital signal processor.
Figure 2:
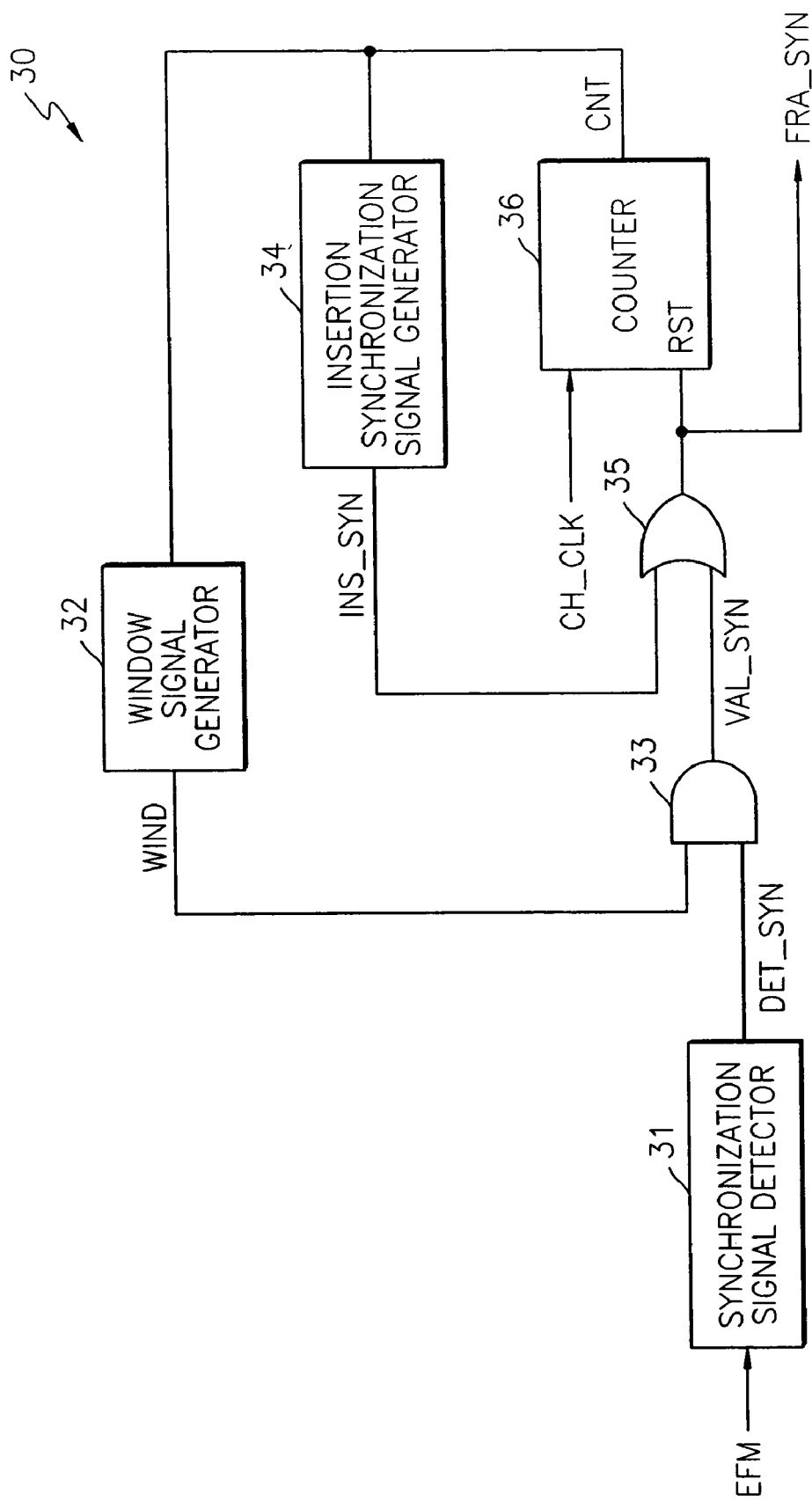
FIG. 2 is a block diagram of a frame synchronization signal detector, according to a conventional technique.
Figure 3:
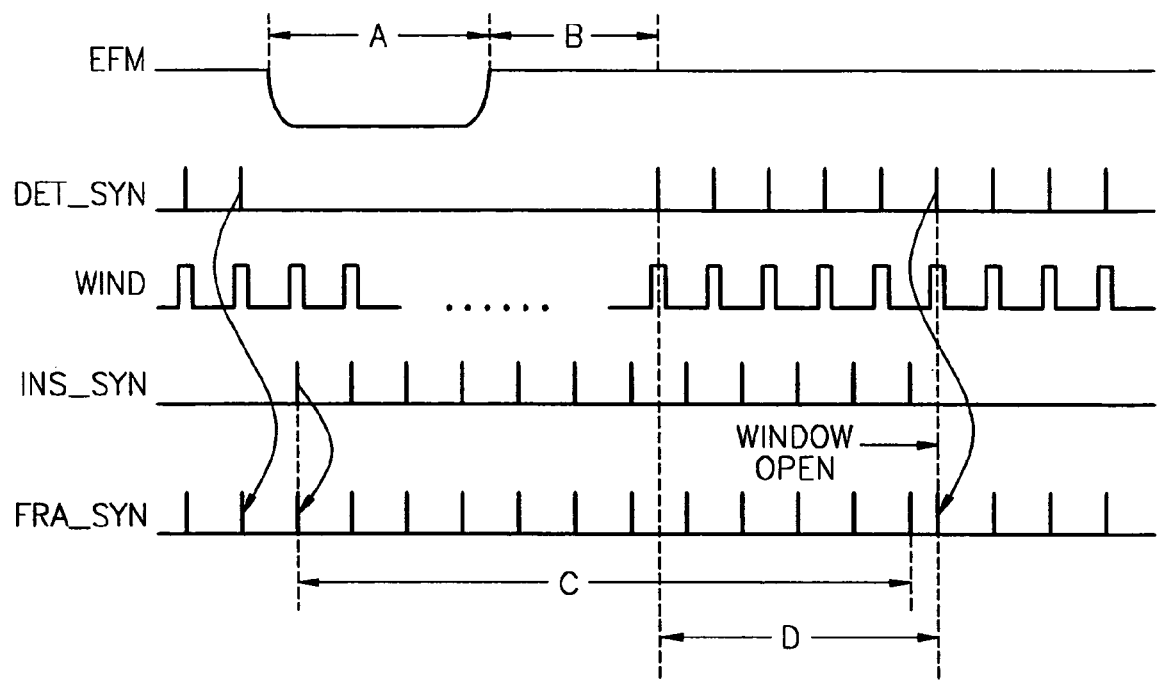
FIG. 3 is a timing diagram of main signals of the frame synchronization signal detector of FIG. 2.
Figure 4:
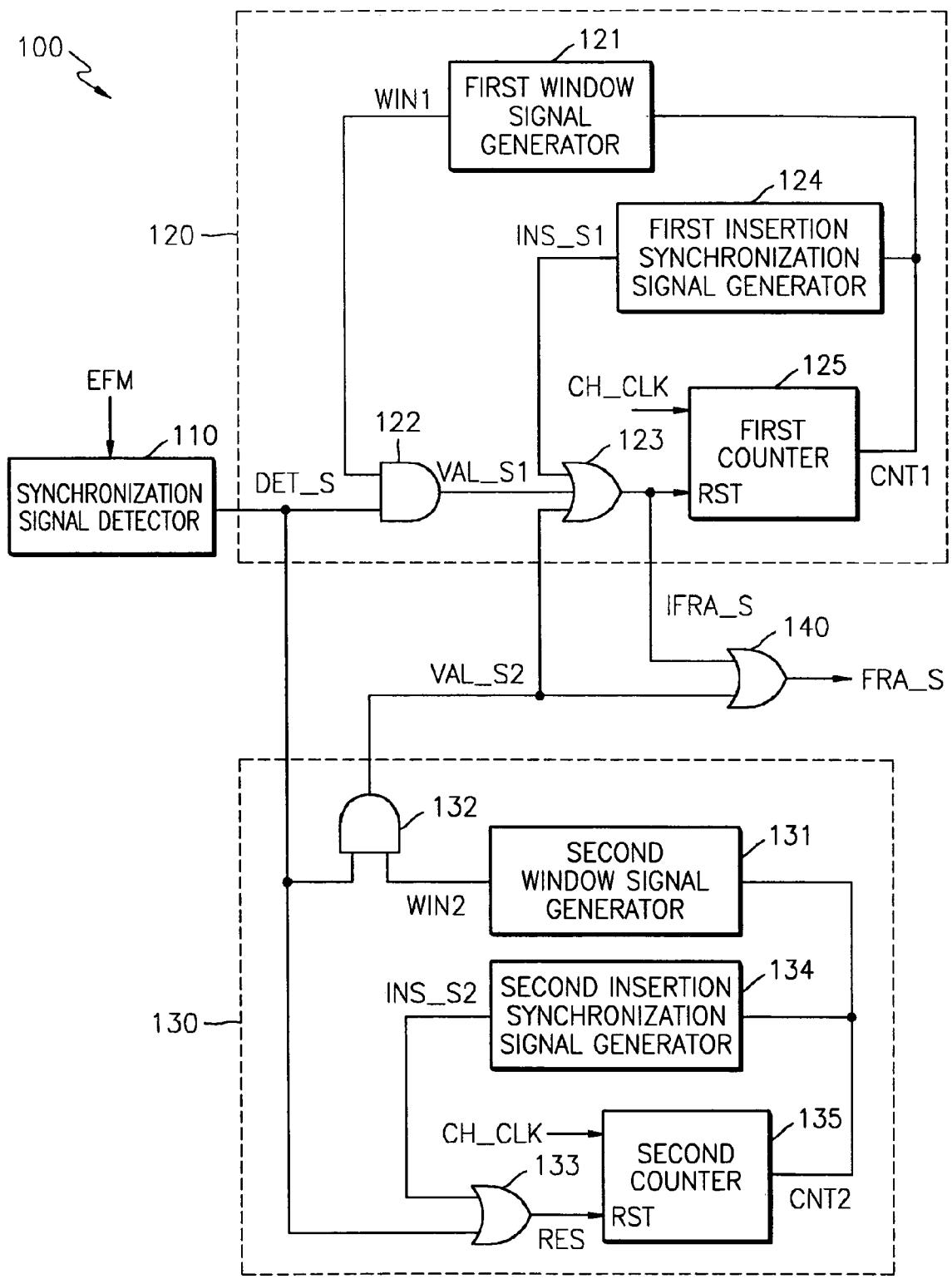
FIG. 4 is a block diagram of a frame synchronization signal detector, according to an embodiment of the present invention.

FIG. 4 is a block diagram of a frame synchronization signal detector, according to a preferred embodiment of the present invention.

As shown in FIG. 4, the frame synchronization signal detector 100 comprises a synchronization signal detector 110, a main frame synchronization signal generator 120, a sub frame synchronization signal generator 130, and an output unit 140.

The synchronization signal detector 110 detects and outputs a synchronization signal DET_S from a digital data signal EFM output from an RF amplifier (not shown).

The main frame synchronization signal generator 120 comprises a first window signal generator 121, a first valid synchronization signal detector 122, an internal frame synchronization signal output unit 123, a first insertion synchronization signal generator 124, and a first counter 125.

The sub frame synchronization signal generator 130 includes a second window signal generator 131, a second valid synchronization signal detector 132, a reset signal output unit 133, a second insertion synchronization signal generator 134, and a second counter 135.

The first and the second window signal generators 121 and 131 enable first and second window signals WIN1 and WIN2 during a predetermined period in response to first and second counting signals CNT1 and CNT2. If the synchronization signal detector 110 outputs the synchronization signal DET_S during the interval in which the first window signal WIN1 is enabled, the first valid synchronization signal detector 122 outputs the synchronization signal DET_S as a first valid synchronization signal VAL_S1.

Here, in the case where the state of a disc surface is good, the first valid synchronization signal detector 122 outputs the first valid synchronization signal VAL_S1 per a period of 1488T±α, wherein T represents a period of a channel clock signal and α represents a natural number.

Also, if the synchronization signal detector 110 outputs the synchronization signal DET_S during the interval which the second window signal WIN2 is enabled, the second valid synchronization signal detector 132 outputs the synchronization signal DET_S as a second valid synchronization signal VAL_S2.

Here, the internal frame synchronization signal output unit 123 receives the first valid synchronization signal VAL_S1 or a first insertion synchronization signal INS_S1 and outputs the received signal as an internal frame synchronization signal IFRA_S.

Here, the first valid synchronization signal detector 122 and the second valid synchronization signal detector 132 may be AND gates, and the internal frame synchronization signal output unit 123 maybe an OR gate.

The first counter 125 is reset in response to the internal frame synchronization signal IFRA_S, counts the rising edges and falling edges of a channel clock signal CH_CLK, and increases a counted value. The first counter 125 outputs a first counting signal CNT1 when the count value reaches a predetermined value. The predetermined value can be set to 1488±α.

Whenever the internal frame synchronization signal IFRA_S is activated, the first counter 125 is reset to a count value of "zero" and restarts counting the channel clock signal CH_CLK.

If the first valid synchronization signal VAL_S1 received from the first valid synchronization signal detector 122 is deactivated during a predetermined time period, the first insertion synchronization signal generator 124 generates a predetermined number of cycles of a first insertion synchronizations signal INS_S1.

The reset signal output unit 133 receives the synchronization signal DET_S or the second insertion synchronization signal INS_S2 and outputs the received signal as a reset signal RES. Here, the reset signal output unit 133 may be an OR gate.

The second counter 135 is reset in response to the reset signal RES, counts a channel clock signal CH_CLK, and increases the count value. The second counter 135 outputs a second counting signal CNT2 when the count value reaches a predetermined value.

The second counter 135 is reset to have a count value of "zero" and restarts counting the channel clock signal CH_CLK whenever the reset signal RES is activated.

The second insertion synchronization generator 134 generates a second insertion synchronization signal INS_S2 and resets the second counter 135 if a synchronization signal DET_S is not received from the synchronization signal detector 110 during a predetermined time period after the second counter 135 is first reset.

The output unit 140 receives the internal frame synchronization signal IFRA_S or the second valid synchronization signal VAL_S2 and outputs the received signal as a frame synchronization signal FRA_S.

The operation of the frame synchronization signal detector described above will be described below with reference to FIGS. 4 through 10.

Figure 5:
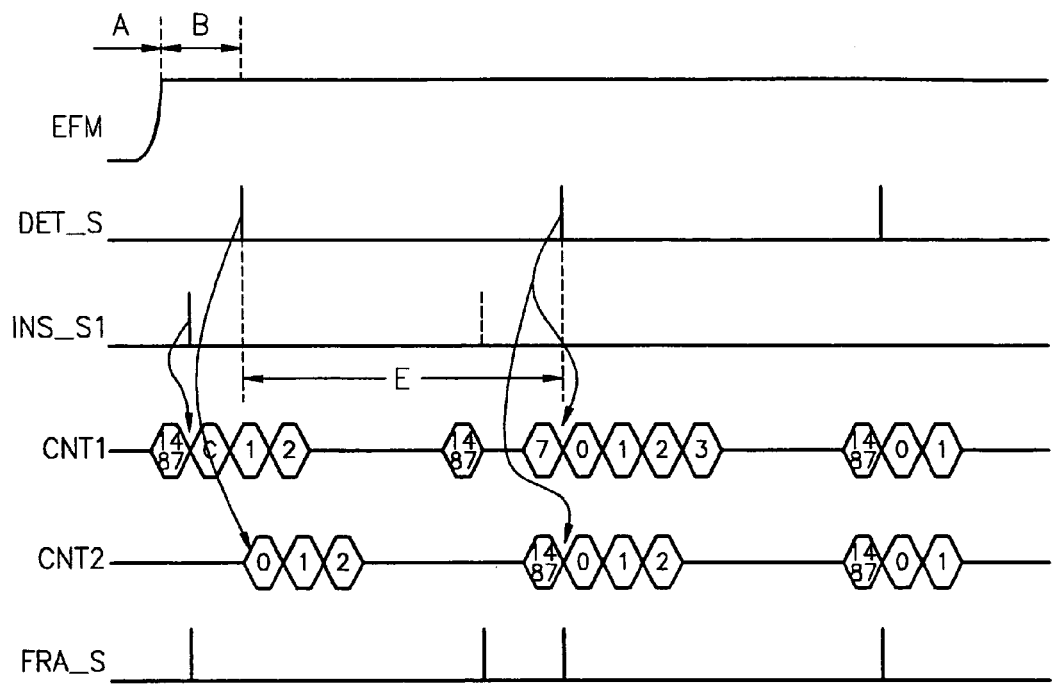
FIGS. 5 and 6 are timing diagrams of main signals of the frame synchronization signal detector of FIG. 4.
Figure 6:
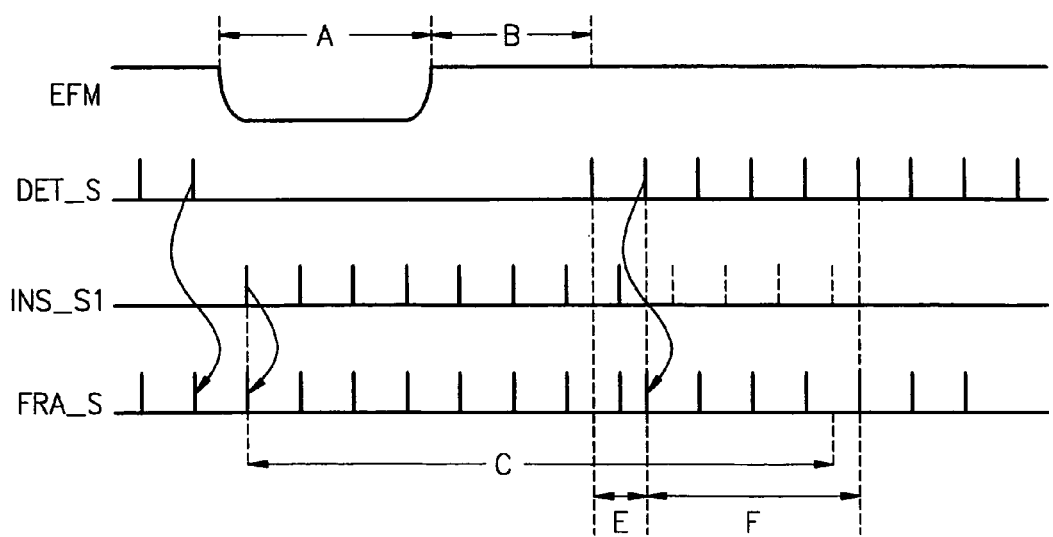
Figure 7:
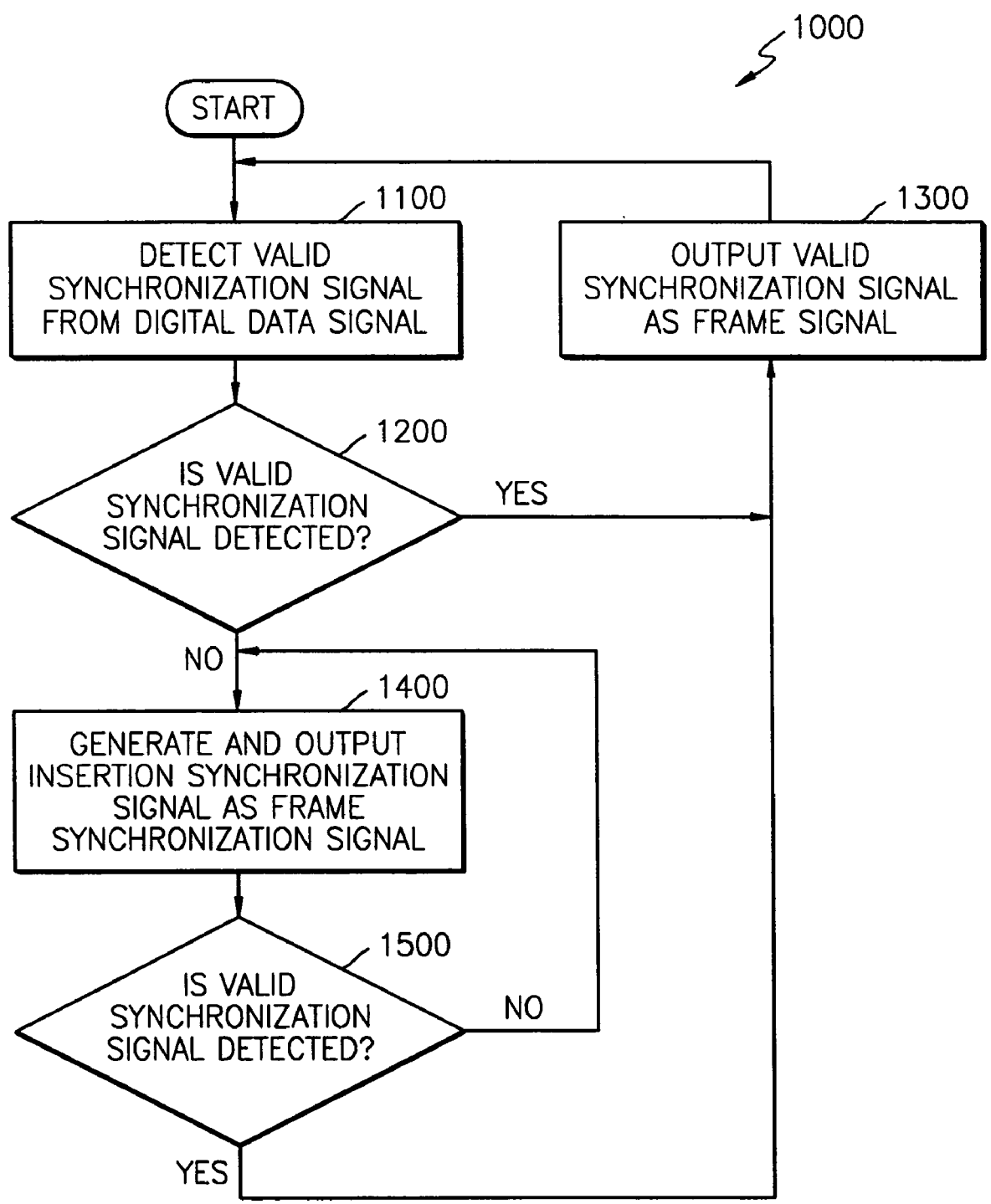
FIG. 7 is a flow chart illustrating an operation process of the frame synchronization signal detector, according to a preferred embodiment of the present invention.

FIGS. 5 and 6 are timing diagrams of main signals of the frame synchronization signal detector shown in FIG. 4. FIG. 7 is a flow chart illustrating the operation of the frame synchronization signal detector, according to a preferred embodiment of the present invention.

Referring to FIG. 7, the first window signal generator 121 enables a first window signal WIN1 and opens a window until the synchronization signal detector 110 outputs a synchronization signal DET_S. If the synchronization signal DET_S is output during the interval in which the first window signal WIN1 is enabled, the first valid synchronization signal detector 122 outputs the synchronization signal DET_S as a first valid synchronization signal VAL_S1 (step 1100). Step 1100 will be described in more detail later, with reference to FIG. 8.

Thereafter, it is determined whether the first valid synchronization signal VAL_S1 is detected (step 1200).

If the first valid synchronization signal VAL_S1 is detected, the internal frame synchronization signal output unit 123 outputs the first valid synchronization signal VAL_S1 as an internal frame synchronization signal IFRA_S to the output unit 140. The output unit 140 outputs the internal frame synchronization signal IFRA_S as a frame synchronization signal FRA_S and returns to step 1100 (step 1300). In the case where the state of the disc surface is good, the first valid synchronization signal VAL_S1 is detected with a period of 1488T±α.

If the first valid synchronization signal VAL_S1 is not detected during a predetermined time period in step 1200, the first insertion synchronization generator 124 generates a predetermined number of cycles of a first synchronization signal INS_S1. The predetermined number of the cycles of the first synchronizations signal INS_S1 can be arbitrarily set to be, for example, 10, 15, 20, 25, 30, . . . and so on.

Here, if the first valid synchronization signal VAL_S1 is not detected during the predetermined time period, the first counter 125 is not reset and continuously counts the channel clock signal CH_CLK. As a result, the count value reaches 1488±α. Accordingly, whether the first valid synchronization signal VAL_S1 is detected during the predetermined time period is determined based on the accumulated value counted by the first counter 125.

Meanwhile, the internal frame synchronization signal output unit 123 outputs the first insertion synchronization signal INS_S1 as the internal frame synchronization signal IFRA_S to the output unit 140. The output unit 140 outputs the internal frame synchronization signal IFRA_S as a frame synchronization signal FRA_S (step 1400). Step 1400 will be described in more detail later, with reference to FIG. 9.

Thereafter, it is determined whether the second valid synchronization signal VAL_S2 is detected (step 1500). Step 1500 will be described in more detail later, with reference to FIG. 10. If the second valid synchronization signal VAL_S2 is not detected in step 1500, then the process returns to step 1400. If the second valid synchronization signal VAL_S2 is detected, the process returns to step 1300.

Figure 8:
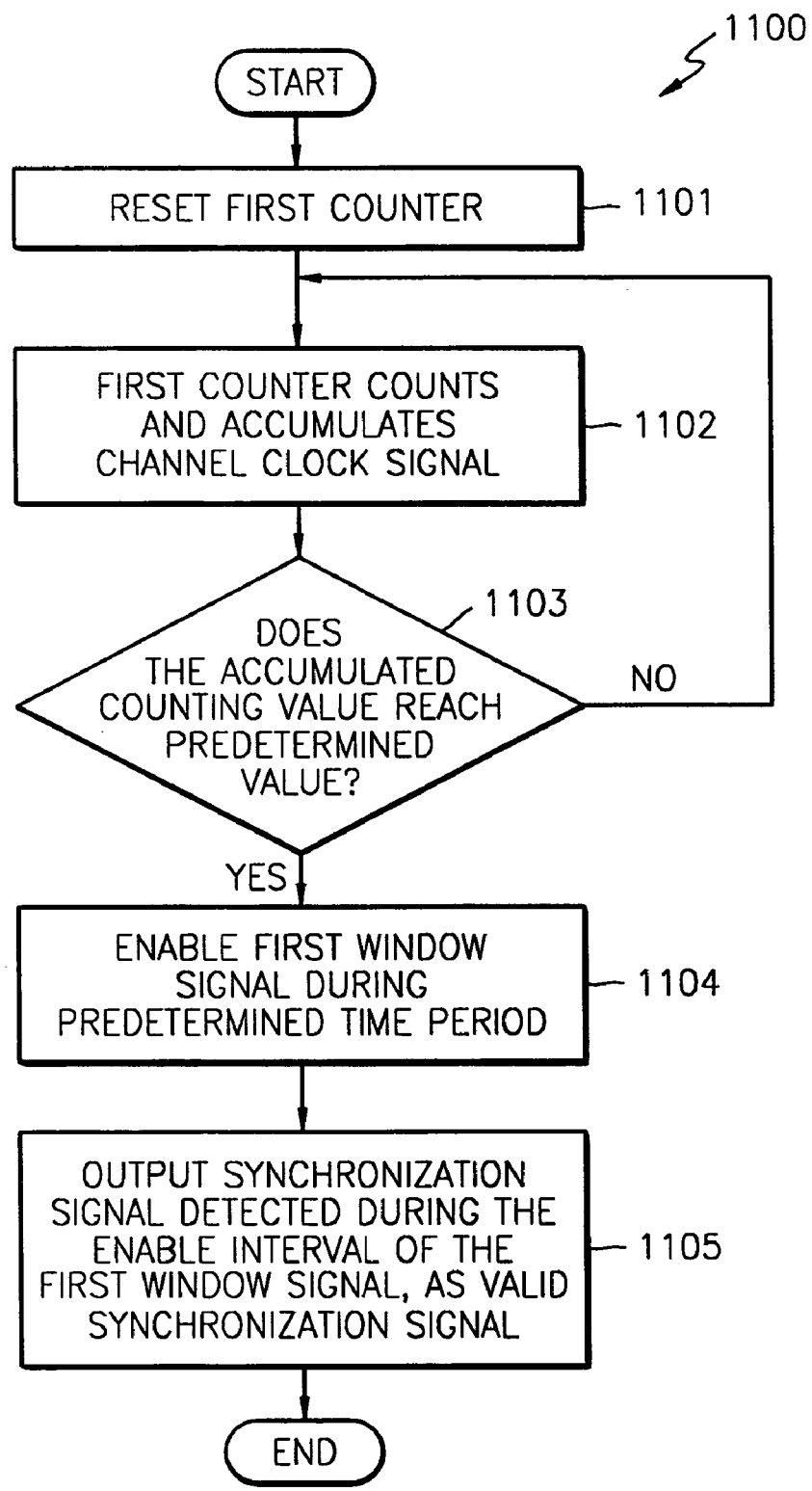
FIG. 8 is a flow chart illustrating in detail a process of detecting a valid synchronization signal of FIG. 7.

FIG. 8 is a flow chart illustrating in detail the process of detecting the valid synchronization signal shown in FIG. 7.

Referring to FIG. 8, the first counter 125 is reset in response to the activation of a first valid synchronization signal VAL_S1 (step 1101). More specifically, the first counter 125 is reset when the first valid synchronization signal VAL_S1 is detected. Thereafter, the first counter 125 counts the channel clock signal CH_CLK and increases the count value (step 1102). When the count value reaches a predetermined value, the first counter 125 outputs a first counting signal CNT1. Here, the predetermined value can be set to be 1488±α.

The first window signal generator 121 enables a first window signal WIN1 during a predetermined time period, in response to the first counting signal CNT1 (step 1104). Here, the predetermined time period can be set to be α.

The first valid synchronization signal detector 122 outputs a synchronization signal DET_S, detected during the enable interval of the first window signal WIN1, as a first valid synchronization signal VAL_S1 (step 1105).

Figure 9:
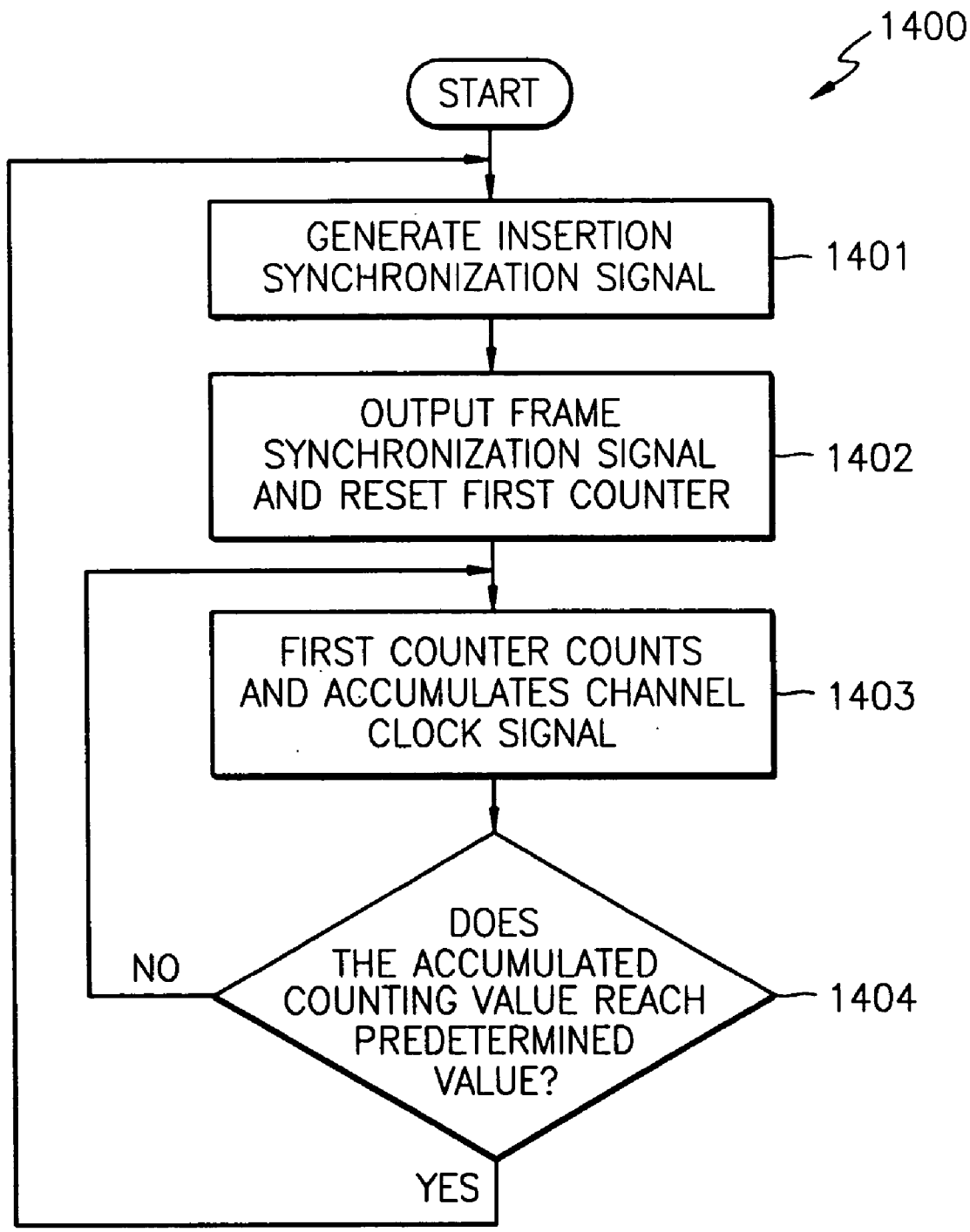
FIG. 9 is a flow chart illustrating in detail a process of generating an insertion synchronization signal of FIG. 7.

FIG. 9 is a flow chart illustrating in detail the process of generating the insertion synchronization signal shown in FIG. 7.

Referring to FIG. 9, the first insertion synchronization signal generator 124 generates a first insertion synchronization signal INS_S1 (step 1401). The internal frame synchronization signal output unit 123 outputs the first insertion synchronization signal INS_S1 as an internal frame synchronization signal IFRA_S. The first counter 125 is reset in response to the internal frame synchronization signal IFRA_S (step 1402).

Thereafter, the first counter 125 counts a channel clock signal CH_CLK, increases the count value (step 1403), and determines whether the count value reaches a predetermined value (step 1404). Here, the predetermined value can be set to be 1488±α.

If the count value does not reach the predetermined value, the process returns to step 1403. If the count value reaches the predetermined value, the process returns to step 1401. As described above, the first synchronization signal generator 124 periodically generates the first insertion synchronization signal INS_S1 with a predetermined period.

Figure 10:
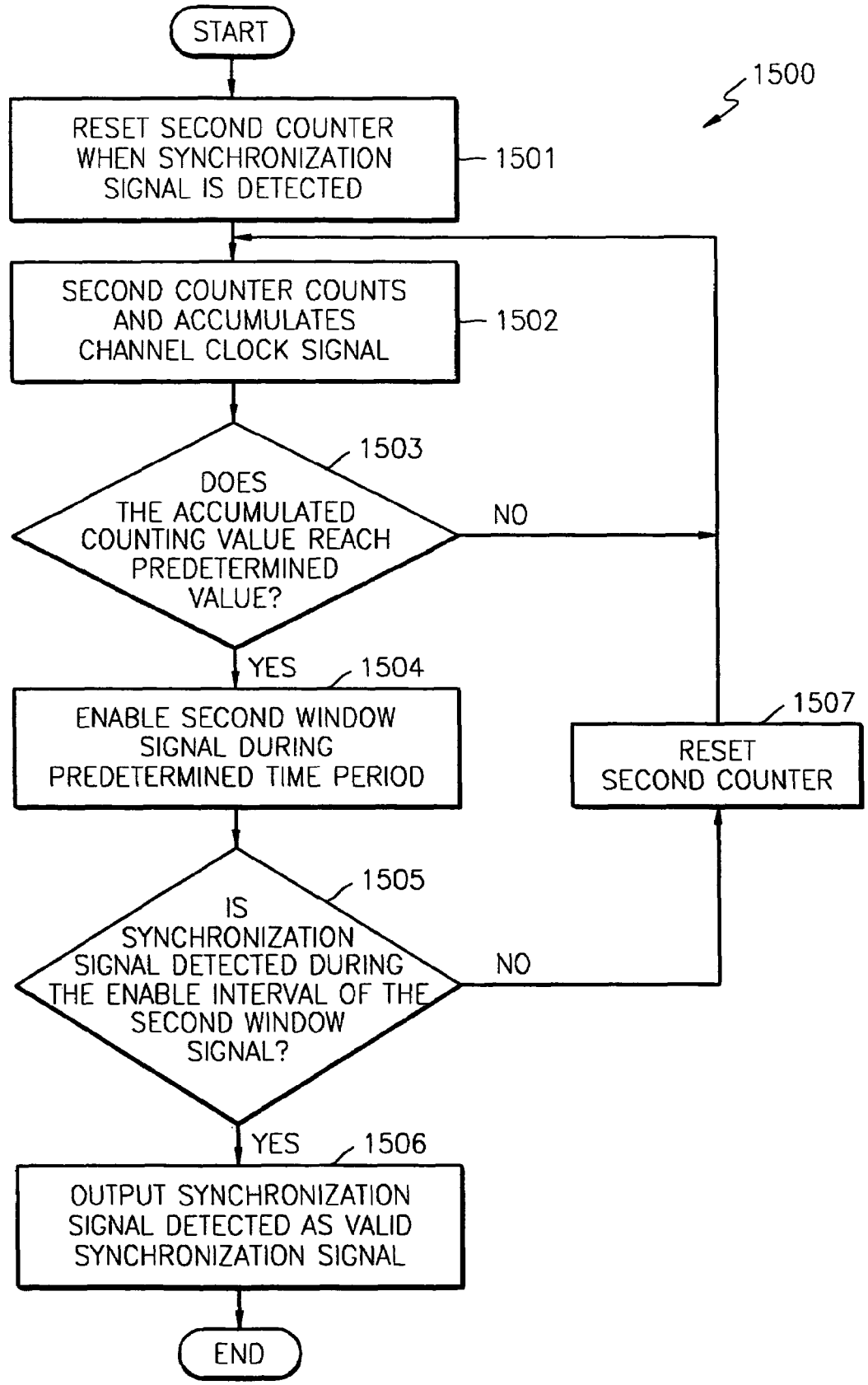
FIG. 10 is a flow chart illustrating a process of determining whether a valid synchronization signal is detected of FIG. 7.

FIG. 10 is a flow chart illustrating in detail the process of determining whether the valid synchronization signal is detected, shown in FIG. 7.

Referring to FIG. 10, if a synchronization signal DET_S is detected by the synchronization signal detector 110 while the first insertion synchronization signal INS_S1 is output as a frame synchronization signal FRA_S, the reset signal output unit 133 outputs the received synchronization signal DET_S as a reset signal RES. The second counter 135 is reset in response to the reset signal RES (step 1501). The process by which the second counter 135 is reset in response to the synchronization signal DET_S and the count value is set to zero is shown in FIG. 5. Meanwhile, the first counter 125 is reset in response to the first insertion synchronization signal INS_S1.

Thereafter, the second counter 135 counts a channel clock signal CH_CLK, increases the count value (step 1502), and determines whether the count value reaches a predetermined value (step 1503). The predetermined value can be set to be 1488±α.

If the count value does not reach the predetermined value, the process returns to step 1502. If the count value reaches the predetermined value, the second window signal generator 131 enables a second window signal WIN2 during a predetermined time period (step 1504). The predetermined time period can be set to be α.

Thereafter, the second valid synchronization signal detector 132 determines whether a synchronization signal DET_S is received from the synchronization signal detector 110 during the interval which the second window signal WIN2 is enabled (step 1505). In step 1505, the second valid synchronization signal detector 132 outputs the synchronization signal DET_S outputted during the interval which the second window signal WIN2 is enabled, as the second valid synchronization signal VAL_S2 (step 1506)

More specifically, when an "E" interval, shown in FIG. 5, i.e., the time interval of 1488±α, elapses after a first synchronization signal DET_S is received from the synchronization signal detector 110, the second valid synchronization signal detector 132 outputs a received second synchronization DET_S as a second valid synchronization signal VAL_S2.

Then, the internal frame synchronization signal output unit 123 receives and outputs the second valid synchronization signal VAL_S2 as an interval frame synchronization signal IFRA_S. The output unit 140 receives the second valid synchronization signal VAL_S2 and the internal frame synchronization signal IFRA_S, and outputs a frame synchronous signal FRA_S in response to the received signals. The first counter 125 is reset in response to the internal frame synchronization signal IFRA_S and restarts counting the channel clock signal CH_CLK.

Thereafter, if the synchronization signal DET_S is continuously output from the synchronization signal detector 110, the first insertion synchronization signal generator 124 stops generating the first insertion synchronizations signal INS_S1 in an "F" interval of FIG. 6. The main frame synchronization signal generator 120 repeats the operations according to the flow chart 1100 shown in FIG. 8. The second counter 135 is reset whenever the synchronization signal DET_S is output from the synchronization signal detector 110. As a result, as shown in FIG. 5, the first and the second counters 122 and 135 are reset whenever the synchronization signal DET_S is output.

Meanwhile, if the synchronization signal DET_S is not output in step 1505, the second counter 135 is not reset and continuously counts the channel clock signal CH_CLK. As a result, the accumulated count reaches 1488±α. At this time, the second insertion synchronization signal generator 134 generates a second synchronization signal INS_S2 and resets the second counter 135 (step 1507). Thereafter, the process returns to step 1502.

As described above, the frame synchronization signal detector of an optical disc system, according to the present invention, can reduce errors in data demodulation by outputting a valid synchronization signal detected during the valid synchronization signal detection interval (denoted by an "F" interval of FIG. 6) as a frame synchronization signal during the insertion synchronization signal generation interval (denoted by a "C" interval of FIG. 6), as shown in FIG. 6.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus which detects a frame synchronization signal from a digital data signal reproduced from an optical disc, the apparatus comprising:
    a synchronization signal detector, which detects and outputs a synchronization signal from the digital data signal;
    a main frame synchronization signal generator, which detects and outputs a first valid synchronization signal from the synchronization signal as an internal frame synchronization signal, and generates and outputs a first insertion synchronization signal as the internal frame synchronization signal, if the first valid synchronization signal is not detected during a predetermined first time period;
    a sub frame synchronization signal generator, which detects and outputs a second valid synchronization signal from the synchronization signal while the main frame synchronization signal generator generates the first insertion synchronization signal; and
    a first output unit, which outputs a frame synchronization signal in response to the internal frame synchronization signal and the second valid synchronization signal, wherein the main frame synchronization signal generator stops generating the first insertion synchronization signal in response to the second valid synchronization signal, and detects and outputs the first valid synchronization signal as the internal frame synchronization signal.

2. The apparatus of claim 1, wherein the main frame synchronization signal generator comprises:
    a first valid synchronization signal detector, which detects and outputs the first valid synchronization signal from the synchronization signal in response to a predetermined first window signal;
    an internal frame synchronization signal output unit, which outputs the internal frame synchronization signal in response to the first valid synchronization signal, the second valid synchronization signal, and the first insertion synchronization signal;
    a first counter, which is reset in response to the internal frame synchronization signal, counts a predetermined channel clock signal, increases a count value, and outputs a first counting signal when the count value reaches a predetermined value;
    a first window signal generator, which enables the first window signal during a predetermined second time period in response to the first counting signal; and
    a first insertion synchronization signal generator, which generates the first insertion synchronization signal, if the first valid synchronization signal received from the first valid synchronization signal detector is not activated during the predetermined first time period.

3. The apparatus of claim 2, wherein the sub frame synchronization signal generator comprises:
    a second valid synchronization signal detector, which detects and outputs the second valid synchronization signal from the synchronization signal in response to a predetermined second window signal;
    a reset signal output unit, which outputs a reset signal in response to the synchronization signal and a second insertion synchronization signal;
    a second counter, which is reset in response to the reset signal, counts a predetermined channel clock signal, increases a count value, and outputs a second counting signal when the count value reaches the predetermined value;

a second window signal generator, which enables the second window signal during the predetermined second time period in response to the second counting signal; and a second insertion synchronization signal generator, which generates the second insertion synchronization signal if the synchronization signal received from the synchronization signal detector is not activated during the predetermined first time period after the second counter is reset.

4. The apparatus of claim 3, wherein the predetermined first time period is a time taken until the accumulated counting value reaches the predetermined value, after the first and the second counters are reset.

5. A method of detecting a frame synchronization signal in a frame synchronization signal detection apparatus of an optical disc system, the frame synchronization signal detection apparatus comprising: a synchronization signal detector which detects a synchronization signal from a digital data signal; a main frame synchronization signal generator, which outputs, as an internal frame synchronization signal, one of a first valid synchronization signal detected from the synchronization signal and an insertion synchronization signal internally generated; a sub frame synchronization signal generator, which detects a second valid synchronization signal, while the main frame synchronization signal generator generates the insertion synchronization signal; and an output unit which outputs a frame synchronization signal, in response to the internal frame synchronization signal and the second valid synchronization signal, the method comprising:

(a) detecting the first valid synchronization signal from the digital data signal;

(b) outputting the first valid synchronization signal as the frame synchronization signal, when the first valid synchronization signal is detected within a predetermined time interval;

(c) generating and outputting the insertion synchronization signal as the frame synchronization signal, if the first valid synchronization signal is not detected during the predetermined time interval; and (d) returning to step (a), if the second valid synchronization signal is activated while the insertion synchronization signal is generated.

6. The method of claim 5, wherein step (d) comprises:

(e) resetting a counter of the sub frame synchronization signal generator, when the synchronization signal is detected;

(f) the counter counting the channel clock signal;

(g) outputting the second valid synchronization signal as the frame synchronization signal if the second valid synchronization signal is detected when the count value of the counter reaches a predetermined value; and (h) resetting the counter and returning to step (f), if the second valid synchronization signal is not detected when the count value of the counter reaches the predetermined value.

* * * * *